(12) United States Patent
Sheehan

(10) Patent No.: US 6,405,558 B1
(45) Date of Patent: Jun. 18, 2002

(54) REFRIGERANT STORAGE APPARATUS FOR ABSORPTION HEATING AND COOLING SYSTEM

(75) Inventor: Darren S. Sheehan, East Syracuse, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/736,702

(22) Filed: Dec. 15, 2000

(51) Int. Cl.⁷ .............................. F25B 15/00; F25B 13/00
(52) U.S. Cl. .......................... 62/476; 62/324.2; 62/148; 62/141
(58) Field of Search .............................. 62/324.2, 148, 62/476, 487, 141, 105, 498, 335, 489

(56) References Cited

U.S. PATENT DOCUMENTS 3,864,930 A * 2/1975 Hopkins ................... 62/141 X
6,067,807 A * 5/2000 Reimann ..................... 62/141
6,260,364 B1 * 7/2001 Moon et al. .................. 62/141

FOREIGN PATENT DOCUMENTS

JP            54047150 A    * 4/1979

* cited by examiner

Primary Examiner—Denise L. Esquivel
Assistant Examiner—Chen-Wen Jiang (57) ABSTRACT

In a two-stage absorption heating and cooling system with refrigerant storage apparatus for converting from a cooling to a heating mode of operation, provision is made to position the refrigerant storage tank in a location vertically above the condenser, and the tank is filled with refrigerant without the use of a pump. This is accomplished by fluidly interconnecting the high-temperature generator directly with the refrigerant storage tank such that after the refrigerant vapor from a high temperature generator is condensed in the low temperature generator, the pressure difference between the high temperature generator and the refrigerant storage tank causes the refrigerant condensate to flow to the refrigerant storage tank. A valve is provided to selectively drain the refrigerant from the storage tank to an evaporator sump when changing from a cooling to a heating mode of operation.

12 Claims, 5 Drawing Sheets

REFRIGERANT STORAGE APPARATUS FOR ABSORPTION HEATING AND COOLING SYSTEM

BACKGROUND OF THE INVENTION

This invention relates generally to absorption heating and cooling systems and, in particular, to a refrigerant storage apparatus therefor.

As is well known, in an absorption heating and cooling system, a refrigerant is initially brought together with an absorbent capable of holding a high concentration of refrigerant to produce a solution suitable for use in the process. Under operating conditions that vary, the amount of refrigerant necessary to keep the system running efficiently will also vary. During operation in the cooling mode, the concentration of refrigerant is preferably relative below, i.e.; the solution is preferably relatively strong. Under this condition, the factors that limit the concentration of refrigerant are the need to prevent cavitation from occurring in the refrigerant pump of the evaporator or crystals of absorbent from forming in the sump of the absorber. As a result, it is common practice to equip the system with a cooling mode refrigerant adjusting system which includes a storage reservoir that is able to store enough refrigerant to prevent the solution from becoming too strong, and to store refrigerant in or release refrigerant from this reservoir as necessary to keep the concentration of the solution within acceptable limits as the demand for cooling fluctuates over the range of conditions over which the system is designed to operate. The storage reservoir often takes the form of the sump located within the system condenser. Since the range of refrigerant concentrations necessary to accommodate this range of conditions is relatively small, the storage capacity which this sump must have in order to accommodate this range of conditions is also relatively small.

One example of a cooling mode refrigerant adjusting system of the above described type is described in unexamined Japanese application 62-178 858, which is assigned to Ebara Ltd. of Tokyo, Japan. In the latter application, there's disclosed an absorption machine in which the gravity flow of liquid refrigerant between the system condenser and the system evaporator is controlled in response to certain sensed system related conditions, such as the solution temperature as it is leaving the absorber. The reservoir for liquid refrigerant is provided inside the condenser and refrigerant is supplied to the evaporator through a first flow path under normal operating conditions. Upon a sensing of an operational condition that demands an increase in the quantity of refrigerant, a second flow path is opened which supplies additional refrigerant from the condenser sump to the evaporator.

Another example of a refrigerant adjusting system is described in U.S. Pat. No. 6,067,807, which is commonly assigned herewith, and which is hereby expressly incorporated herein by reference. In the latter patent, there's disclosed an absorption type machine in which refrigerant is stored in a holding tank that is separate from the condenser sump and that is filled via a refrigerant bleed line. The desired refrigerant concentration is then maintained by releasing refrigerant from the holding tank under the control of a microprocessor in response to the sensing of a need for additional refrigerant.

An example of a refrigerant adjusting system that is specially adapted for use in an absorption type refrigerator is described in U.S. Pat. No. 5,806,325 (Furukawa, et al.). In the latter patent there's described an absorption type refrigerator in which a storage reservoir is formed in the condenser by a dam with an array of holes that allows the rate at which refrigerant is released to vary as a function of the rate at which refrigerant condenses and, consequently, as a function of the cooling load that the refrigerator must support.

In addition to the need for refrigerant storage to accommodate load fluctuations during the cooling mode as described above, there is also a need to store refrigerant during operation in the cooling mode, and to release that refrigerant to the system during operation in the heating mode. That is, during operation in the heating mode, the solution is preferably as weak as the capacity of the system permits. Accordingly, when an absorption heating and cooling system is switched from operation in its cooling mode to operation in its heating mode, it is desirable to introduce as much additional refrigerant into the system as is possible. In accordance with the prior art, the additional refrigerant necessary to enable the system to operate efficiently in its heating mode has been provided in either of three ways.

One approach is to provide an evaporator sump which is sufficiently large to store the refrigerant that is not being used while operating in the cooling mode. The problem with this is that the evaporator must be unnecessarily large to accommodate this larger sump thereby adding expense and significantly increasing the footprint of the system Another approach is to locate a storage tank in the condenser vessel. Although this is preferable over storing refrigerant in the evaporator, it is still undesirable because of the need to have a larger condenser vessel than would otherwise be necessary. An example of this approach is shown in copending U.S. patent application's Ser. No. 09/491, 667, filed Jan. 27, 2000, which is commonly assigned herewith, and is hereby expressly incorporated herein by reference. In this application, there is disclosed an absorption machine in which refrigerant is stored in the reservoir located in the condenser during cooling mode operation and then emptied by a valve into the evaporator sump when changing over to the heating mode operation. It is also mentioned that the reservoir may be located outside of the condenser, but in any case, it is positioned so as to fill from the condenser by gravity. That is, in order to avoid the use of a pump, it must necessarily be located vertically below the condenser. This requirement presents a significant restriction on the design possibilities and severely limits the designer from storing refrigerant in locations that may be more convenient, practical and economical.

In view of the foregoing, it will be seen that, prior to the present invention, there existed a need for a simple, inexpensive, and practical approach in an absorption type heating and cooling system for storing refrigerant in a convenient location during operation in the cooling mode for release to the evaporator sump when switching over to operation in the heating mode.

SUMMARY OF THE INVENTION

In accordance with one aspect of invention, there is provided an absorption type heating and cooling system with a refrigerant storage tank having a capacity which permits the storage of sufficient refrigerant which, when released to the system for operation in the cooling mode, will result in an efficient cooling operation, which storage tank may be physically located in a position that is vertically above the condenser so as to give the designer greater flexibility in spatially arranging the various components within the system.

In accordance with another aspect to the invention, of the absorption system is a double effect machine having both high-temperature and low temperature generators. The high-temperature generator is fluidically coupled to the storage tank in such a way that refrigerant vapor passes from the high-temperature generator and through the low temperature generator, where it gives up its heat and is converted to liquid form, with the liquid refrigerant then passing on to the refrigerant storage tank. The pressure difference between the high-temperature generator and the refrigerant storage tank is sufficient to cause the liquid refrigerant to flow into the storage tank even though the storage tank is located at a relatively high elevational position.

By another aspect of the invention, the storage tank has an overflow structure which provides for the storage of a predetermined volume of refrigerant, with any further flow of refrigerant into the storage tank being caused to overflow into a conduit and pass by gravity to an evaporator sump. A valve is provided to fluidically interconnect the storage tank to the conduit, such that when the valve is opened, the stored refrigerant is drained from the tank and flows through the conduit to the evaporator sump.

By yet another aspect of the invention, the condenser is fluidically interconnected to the conduit passing to the evaporator sump, such that the condensate forming in the condenser passes by gravity flow to the evaporator sump during cooling mode operation.

In the drawings as hereinafter described, a preferred embodiments is depicted; however, various other modifications and alternate constructions can be made thereto without departing from the true spirit and scope of the invention.

DETAILED DESCRIPTION OF THE INVENTION

Figure 1:
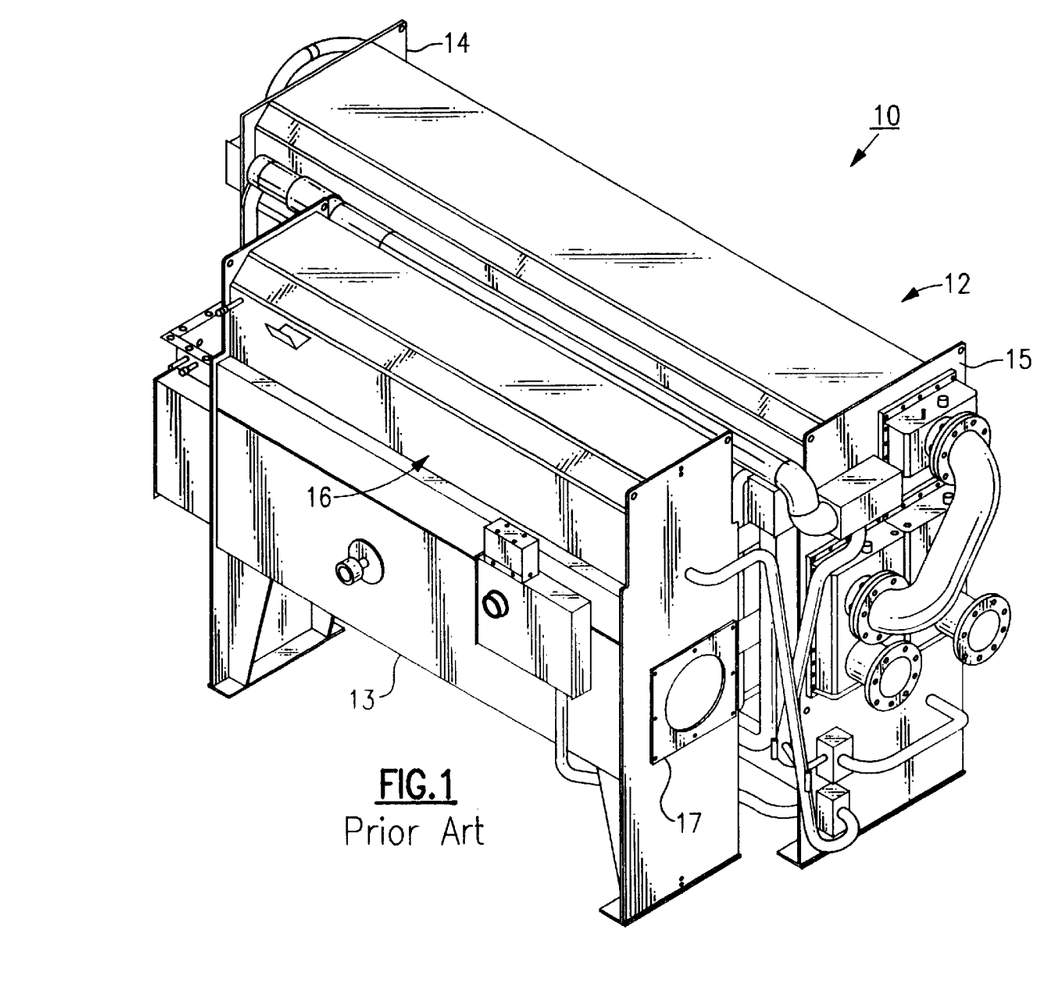
FIG. 1 is a simplified, oblique front view of a multiple-stage absorption heating and cooling system of one type that is suitable for use in practicing the present invention.

Referring initially to FIG. 1, there is shown a simplified, oblique front view of an absorption heating and cooling machine 10 of one of the many types which are known in the art. Machine 10 includes a first main section 12 and a second smaller section 13 that is positioned to one side of the main section. The main section of the machine contains a pair of vertically disposed spaced apart tube sheets 14 and 15 that form parts of the machine's support structure. Second machine section 13 contains a high temperature generator and a burner for heating a solution that is delivered to the generator from the system absorber which is housed in the main section of the machine along with a second low temperature generator, a condenser, an evaporator and a pair of solution heat exchangers. The heat exchanger tubes of the various components are mounted in axial alignment in the two tube sheets and enclosed within suitable leak tight shells welded to the tube sheets.

Figure 2:
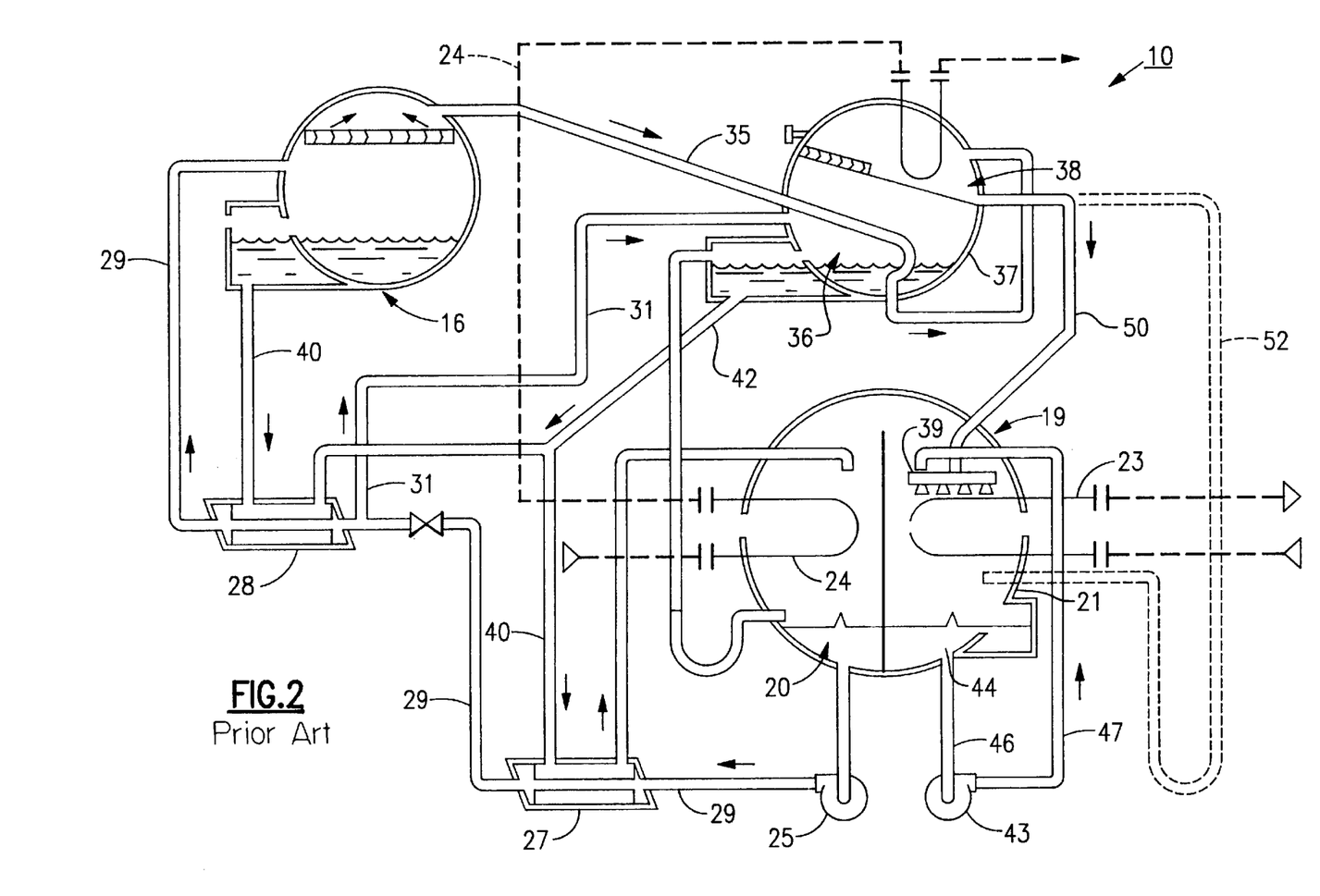
FIG. 2 is a schematic diagram of a system of the type shown in FIG. 1 which does not include a refrigeration storage apparatus of the type contemplated by the present invention.

Referring to FIG. 2, there is shown a schematic representation of a known absorption system of one of the types that may be used in machine 10 of FIG. 1, in this case a two-stage parallel cycle solution circuit. Other types of absorption systems may use more stages, and may use a series rather than a parallel cycle the unit may be fired directly or indirectly. It will therefore be understood that the absorption system of FIG. 2 comprises a representative one of the many types of absorption systems that might have been selected to provide a descriptive background for the description of the invention. As will be explained more fully later, the refrigerant control apparatus of the invention may be applied to any of these types of heating and cooling systems.

The absorption system of FIG. 2 comprises a closed fluidic system that can operate in either a cooling mode or in a heating mode, depending upon the concentration of the absorbent in the refrigerant-absorbent solution, and on the total quantity of liquid within the system. When the system of FIG. 2 operates in its cooling mode, the solution is preferably has a first, relatively high concentration of the absorbent, i.e., is relatively strong or refrigerant-poor, and the total quantity of liquid within the system is relatively small. When the system of FIG. 2 operates in its heating mode, the solution preferably has a second, relatively low concentration of the absorbent, i.e., is weak or refrigerant-rich, and the total quantity -of liquid within the system is relatively large. In the following brief description of the operation of the system in these modes, it will be assumed that machine 10 employs water as a refrigerant and lithium bromide, which has a high affinity for water, as an absorbent.

The absorption system shown in FIG. 2 includes an evaporator 19 and an absorber 20 mounted in a side-by-side relationship within a common shell 21. When the system is operating in its cooling mode, liquid refrigerant used in the process is vaporized in the evaporator where it absorbs heat from a fluid, usually water, that is being chilled. The water being chilled is brought through the evaporator by a chilled water line 23. Vaporized refrigerant developed in the evaporator passes to the absorber where it is combined with an absorbent to form a weak solution. Heat developed in the absorption process is taken out of the absorber by means of a water line 24.

The weak solution formed in the absorber is drawn therefrom by means of a solution pump 25. This solution is passed in series through a first low temperature solution heat exchanger 27 and a second high temperature solution heat exchanger 28 by a delivery line 29. As will be explained in greater detail below, the solution is brought into heat transfer relationship with relatively strong solution being returned to the absorber from the two generators employed in the system, thereby raising the temperature of the weak solution as it moves into the generators.

Upon leaving the low temperature solution heat exchanger, a portion of the solution is sent to the low temperature generator 36 via low temperature solution line 31. The remaining solution is sent through the high temperature solution heat exchanger 28 on to the high temperature generator 16 via solution line 29. Although not shown in FIG. 2, the solution in the high temperature generator is heated by the burner to vaporize the refrigerant, and thereby remove it from the solution. The refrigerant vapor produced by high temperature generator 16 passes by way of vapor line 35, through the low temperature generator 36, and to the condenser 38. Additional refrigerant vapor is added t6 condenser 38 by low temperature generator 36, which is housed in shell 37 along with the system condenser 38. In the low temperature generator, the weak solution entering from line 31 is heated by the vaporized refrigerant passing through vapor line 35 and added to the refrigerant vapor produced by the high temperature generator. In the condenser, refrigerant vapor from both generators are placed in heat transfer relationship with the cooling water passing through line 24 and condensed into liquid refrigerant.

Refrigerant condensing in the condenser is gravity fed to a spray head 39 located in the top part of evaporator 19 via a condensed refrigerant outlet line 50. On being sprayed into the evaporator, a portion of the refrigerant vaporizes to cool the water flowing through chilled water line 23, and the remainder collects within evaporator sump 44. A refrigerant pump 43 is connected to the sump 44 of evaporator 19 by a suction line 46 and is arranged to return liquid refrigerant collected in the sump back to spray head 39 via supply line 47. Evaporator 19 may also be designed so that condensed refrigerant is routed directly to sump 44 via a suitable J-tube 52 (shown in dotted lines) and bypasses spray head 39. In systems which use evaporators of the latter type, all of the refrigerant sprayed over chilled water line 23 is supplied by refrigerant pump 43 via line 47.

Strong absorbent solution flows from the two generators back to the absorber to be reused in the absorption cycle. On its return, the strong solution from the high temperature generator is passed through the high temperature solution heat exchanger 28 and then through the second low temperature solution heat exchanger 27 via solution return line 40. Strong solution leaving the low temperature generator is connected into the solution return line by means of a feeder line 42 which enters the return line at the entrance of the second solution heat exchanger.

In heating and cooling systems which use cooling mode refrigerant adjusting systems of the type described in unexamined Japanese application 62-178858, and in U.S. Pat. No. 5,806,325 (Furukawa et al), the condenser shown in FIG. 2 is provided with a condenser sump (not shown) that is located near the point where condenser 38 is connected to condensed refrigerant outlet line 50. This condenser sump is designed to store a quantity of liquid refrigerant which is just sufficient to allow the concentration of the solution to be adjusted as necessary to assure optimum operating efficiency under conditions in which the cooling load on the system fluctuates with time. Such adjustments are accomplished by draining additional refrigerant from the condenser sump to the evaporator sump, via a controllable valve and specially provided drain line (not shown), in response to a system variable such as the temperature of the solution at the outlet of the absorber. When the quantity of condensed refrigerant in the condenser exceeds the capacity of this condenser sump, the condenser sump overflows into refrigerant outlet line 50 (or 52) and is supplied to the evaporator in the manner described above. Since adjusting systems of this type are described in detail in the above-cited references, they will not be further discussed herein.

The heating and cooling system shown in FIG. 2 may also operate in a heating mode, if the quantity of refrigerant in the system as a whole is increased by the amount necessary to cause the refrigerant in evaporator 19 to rise to a level sufficient to overflow partition P and flow into absorber 20. This is because, under the latter condition, condensed refrigerant flowing into evaporator 19 does not vaporize and, therefore, does not therefore absorb heat from the liquid flowing through line 23. Instead, hot, freshly condensed refrigerant transfers heat to the water flowing through line 23 by direct conduction and thereby makes that heat available to the space to be heated. Heat which the system transfers to the water flowing through line 24 may also be transferred to the space to be heated. It will therefore be seen that the system shown in FIG. 2 is able to either cool or heat the space to be heated, depending on whether the solution used therein is refrigerant-poor, i.e., has a first, relatively high concentration of the absorbent, or refrigerant-rich, i.e., has a second, relatively low concentration of the absorbent). As a result, the system can be converted from operation in its cooling mode to operation in its heating mode, and back again, by adding to or withdrawing from the system the quantity of refrigerant that corresponds to the difference between these concentrations, and making appropriate changes in the connections of lines 23 and 24.

Heretofore, the storage of refrigerant for the purpose of converting the system from operation in its cooling mode to operation in its heating mode was by way of a reservoir within the condenser or by way of a reservoir located outside of, and vertically below, the condenser so as not to require a pump but rather to allow for gravity feed of condensate from the condenser to the tank.

As will now be explained with reference to FIGS. 3 through 6, the present invention comprises a refrigerant control apparatus that provides a new, simple, practical and inexpensive way of storing refrigerant in a heating and cooling system of the representative type described in connection with FIG. 2.

Figure 3:
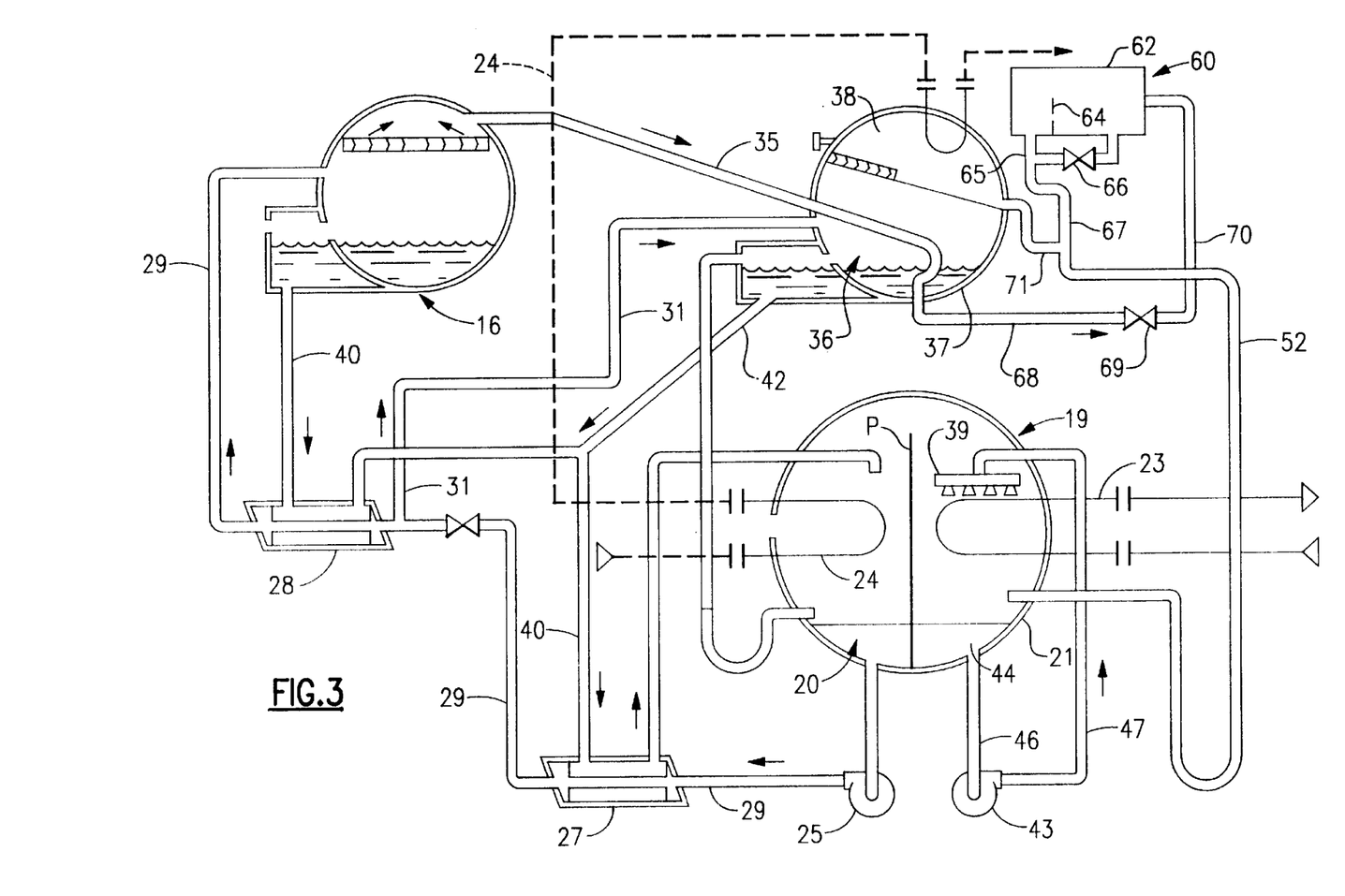
FIG. 3 is a schematic diagram of a system of the type shown in FIG. 1 which has been modified to include a refrigeration storage apparatus of the type contemplated by the present invention.

Referring to FIG. 3, there is shown a heating and cooling system of the type described in connection with FIG. 2 which has been modified to include one embodiment of the present invention. The system shown in FIG. 3 is generally similar to that shown in FIG. 2, like functioning parts being similarly numbered, except that the system shown in FIG. 3 includes a refrigerant storage apparatus 60 which, as will be seen, is positioned vertically above the condenser 38, in a location to be moved fully described hereinafter. In accordance with the present invention, refrigerant storage apparatus 60 includes a tank 62 having a storage capacity sufficient to store, during operation in the cooling mode, a quantity of liquid refrigerant large enough that, if released into heating and cooling system 10, it would reduce the steady state concentration of the solution therein from its first or cooling mode concentration to its second or heating mode concentration. Refrigerant storage apparatus 60 also includes an overflow structure 64, which may comprise a dam, standpipe or the like, that allows liquid refrigerant to flow out of tank 62 and into the evaporator sump 44 by way of lines 65, 67, and 52 when the quantity of refrigerant in that tank exceeds the storage capacity thereof. Finally, refrigerant storage apparatus 60 includes a valve 66 through which refrigerant in tank 62 may be transferred from the tank 62 to evaporator 19 by way of lines 67 and 52 when the heating and cooling system is switched from operation in its cooling mode to operation in its heating mode.

It will therefore be seen that the refrigerant storage tank 62, rather than being supplied with refrigerant from the condenser as in the prior art, is supplied with refrigerant directly from the high-temperature generator. That is, the refrigerant vapor coming from the high-temperature generator 16 along line 35 passes first through the low-temperature generator 36 where it is condensed into liquid form. The liquid refrigerant then passes along line 68, through a restrictor 69 ,such as an orifice or an expansion valve or the like, and line 70 to the storage tank 62. The restrictor 69 is sized such that the refrigerant passing into the tank 62 will be in liquid form.

The present invention therefore uses the high-pressure of the refrigerant vapor from the high-temperature generator to move the refrigerant condensate to a tank that is located vertically above the condenser, thereby facilitating greater design flexibility in the relative positioning of components within the system. Typically, the pressure in the high-temperature generator is around 740 mm hg. when the system is at full load, whereas the pressure in the low temperature generator at full load is around 50 mm hg. As will be seen, since the condenser 38 is connected to the line 67 by way of line 71 for drainage of its condensate to the evaporator sump by way of line 52, the pressure in the tank 62 is substantially the same as that in the low-temperature generator. At full load there is therefore a differential pressure of around 690 mm hg. to cause the liquid refrigerant to flow into the tank 62. At part load conditions, the pressure in the high-temperature generator is in the range of 250–300 mm hg. and that in the low temperature generator is 50 mm hg. Thus, even under part lo ad conditions, there is a pressure differential of around 200 mm hg., which is sufficient to cause the condensate to flow to the storage tank 62 even when it is located above the condenser. The sizing of the restrictor 69 will depend on, and will be chosen to accommodate, the particular vertical height that the storage tank 62 is placed above the condenser. It is preferable that the pressure difference between the high-temperature generator and the refrigerant storage tank remain above 50 m hg. at part load conditions.

When the system of FIG. 3 operates in its cooling mode, valve 66 is closed. Under this condition the tank 62 remains full, thereby withholding from the system enough refrigerant for the system to operate at the relatively high absorbent concentration that assures efficient operation in that mode. W,hen the system operates in its heating mode, valve 66 is open. Under this condition, tank 62 remains virtually empty, thereby keeping in circulation within the system enough refrigerant for the system to operate at the relatively low absorbent concentration that assures efficient operation in that mode. When, after being op en, valve 66 is once again closed, condensed refrigerant will accumulate within tank 62 until there is withdrawn from the system enough refrigerant to restore the relatively high absorbent concentration that is desirable for operation in the cooling mode. It will therefore be seen that, by opening and closing valve 66, the system of FIG. 3 may be switched from operation in its cooling mode to operation in its heating mode, and back again, without using pumps, pump switches, float valves, etc. of the type used in the prior art.

Figure 4:
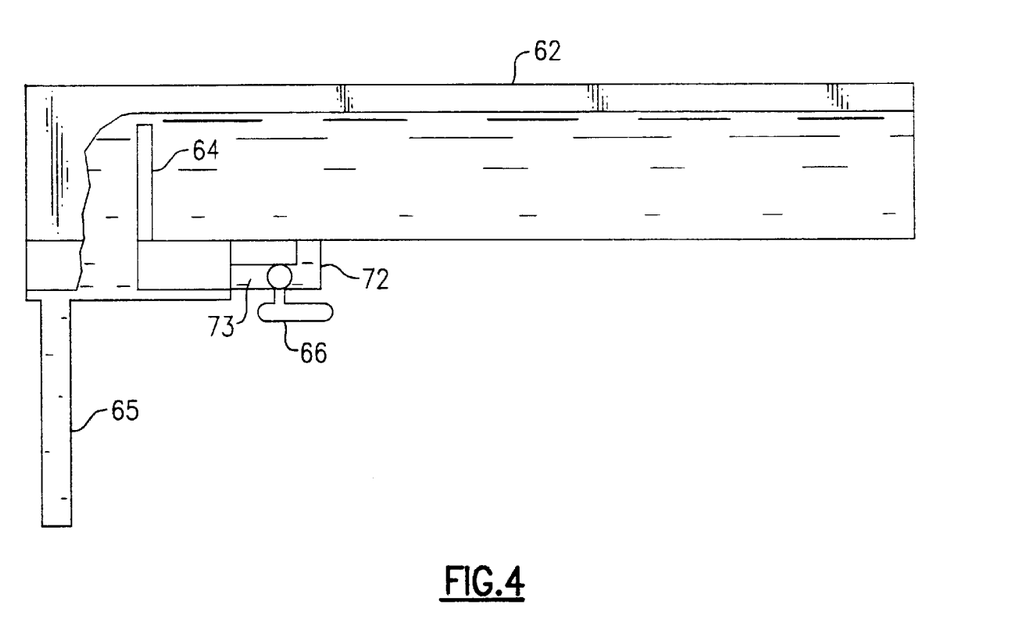
FIG. 4 is a simplified, cutaway view of the refrigeration storage tank of the apparatus shown in FIG. 3.

As is most clearly shown in FIG. 4, valve 66 is located below tank 62 and is connected in bypass or parallel relationship to dam 64 via refrigerant lines 72 and 73. The location of valve 66 below tank 62 assures that tank 62 can be fully emptied when the system is switched from operation in its cooling mode to operation in its heating mode. The parallel relationship between dam 64 and valve 66 assures that refrigerant can flow to the evaporator, via line 52, both when valve 66 is closed and when valve 66 is open.

Figure 5:
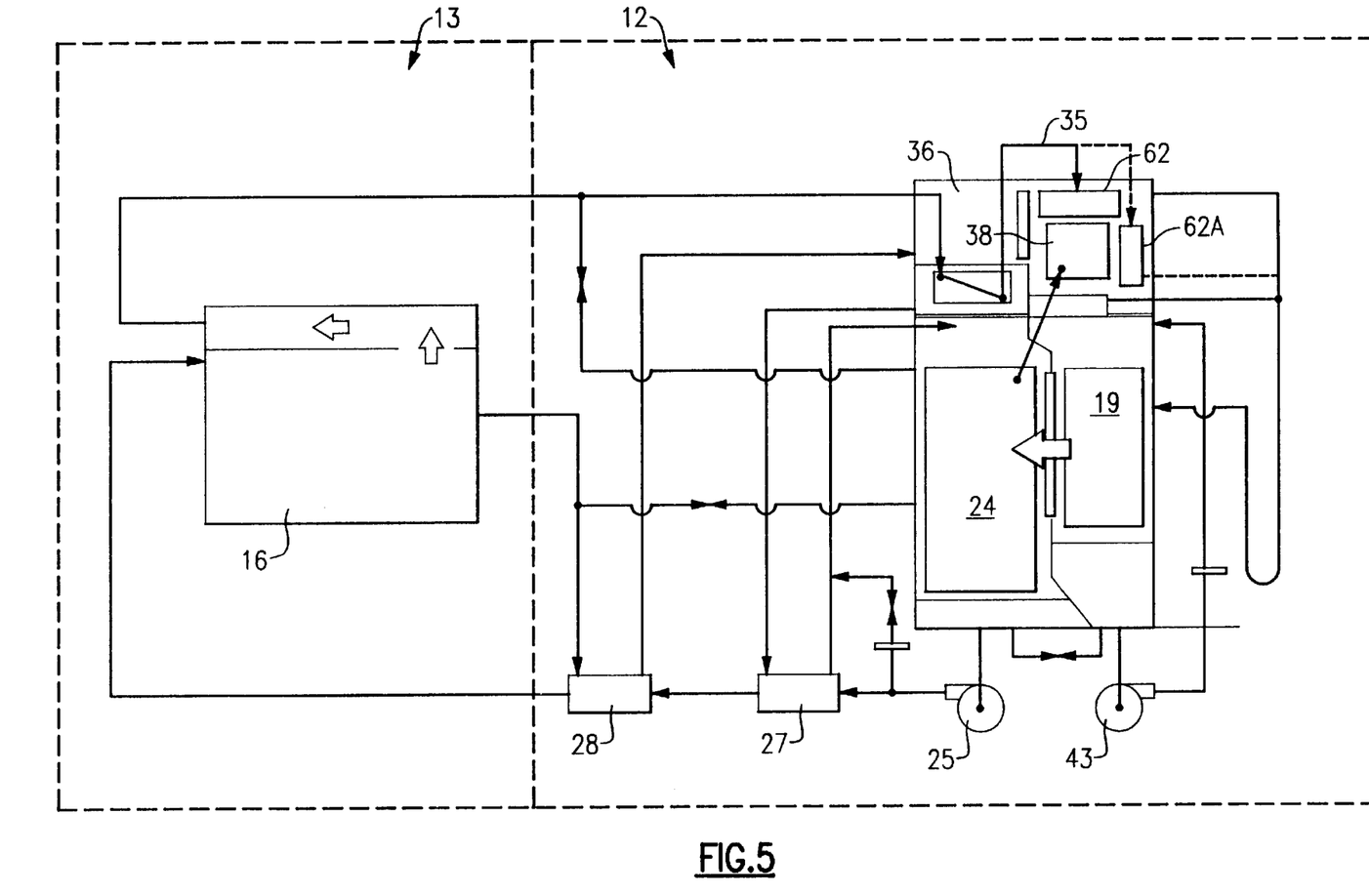
FIG. 5 is a schematic view of a heating and cooling system showing specific placements of a refrigerant storage tank within the system.

Referring to now to FIG. 5, and there is shown a typical absorption heating and cooling system which has been designed to accommodate the present invention. Similar to the FIG. 1 embodiment, section 13 of the system contains the high-temperature generator, which can be fired directly or indirectly, while section 12 contains an evaporator 18, an absorber 24, a low-temperature generator 36, and a condenser 38, as well as heat exchangers 27 and 28 and pumps 25 and 43. However, unlike the FIG. 1 embodiment, a storage tank 62 is included in the vessel which contains the low-temperature generator 36 and the condenser 38. It will be seen that the storage tank 62 is positioned vertically above the condenser 38 such that it cannot be gravity fed from the condenser as was done in the prior art. The filling of a storage tank 62 with liquid refrigerant is accomplished by way of the direct interconnection with the higher pressure, high temperature generator 16 by way of line 35 as described above.

An alternative location for the storage tank is shown at 62 A wherein, it would appear that the condenser 38 and the storage tank 62 are at the same vertical height, but there are portions of the storage tank 62 A that are above the vertical height of the condenser 38, such that an interconnection between the two would not result in a transfer of liquid refrigerant from the condenser 38 to the storage tank 62 A by gravity alone. The present invention however would facilitate such a placement of the storage tank 62 A. Other such locations will, of course, occur to one skilled in the art.

While the refrigerant storage apparatus of the invention has been described with reference to a two-stage, parallel cycle absorption heating and cooling system, it could just as well have been described with reference to heating and cooling machines of any of a variety of other types, including a three stage, series cycle system, among others. This is because systems of all types are differentiated from one another largely by the numbers of their generators and heat exchangers and by the ways in which the latter are connected to one another and to the absorber, and not by the way in which their condensers are connected to their evaporators. Since it is the latter connections that are important for purposes of the present invention, it will be seen that the refrigerant storage apparatus of the invention may be applied to all of these systems, without regard to the numbers of their stages or the kinds of cycles used therein. Accordingly, in order to avoid needless repetition, the application of the invention to these other types of systems will not be specifically described herein. It will nevertheless be understood that such systems are within the contemplation of the present invention.

What is claimed is:

1. In an absorption system of the type having high and low temperature generators, a condenser associated with the low temperature generator, an absorber, and an evaporator with the sump, all connected to form a closed fluidic system, an improved refrigerant storage system comprising:

a refrigerant storage tank located vertically above the condenser and having a storage capacity sufficient to store, during operation in a cooling mode, a quantity of liquid refrigerant which, when released for heating mode operation, is sufficient to reduce the concentration of an absorbent to operate the system efficiently in the heating mode of operation;

fluidic connection means between the high-temperature generator, the low-temperature generator, and said refrigerant storage tank during cooling mode operation so as to allow refrigerant vapor to pass from the high temperature generator to said low temperature generator, where it is condensed, and for the resultant liquid refrigerant to pass on to said refrigerant storage tank.

2. A refrigerant storage system as set forth in claim 1 and including drainage means for selectively transferring stored refrigerant from said refrigerant storage tank to said evaporator sump when the system is changed from cooling to heating mode of operation.

3. A refrigerant storage system as set forth in claim 1 and including overflow structure to allow refrigerant to flow out of said refrigerant storage tank and into the evaporator sump when the quantity of liquid refrigerant in the storage tank exceeds a predetermined storage capacity.

4. A refrigerant storage system as set forth in claim 1 wherein said fluidic connection means between the low-temperature generator and said refrigerant storage tank includes a flow restrictor for restricting the flow of refrigerant vapor to said refrigerant storage tank.

5. A refrigerant storage system as set forth in claim 2 wherein said drainage means between said refrigerant storage tank and the evaporator sump is interconnected to the condenser to allow condensate from said condenser to flow to the evaporator sump.

6. A refrigerant storage system as set forth in claim 1 wherein the minimum pressure difference between the high-temperature generator and said refrigerant storage tank during part load operation of the absorption system is at least 150 mm hg.

7. A refrigerant storage apparatus for an absorption heating and cooling system of the type having a condenser, an absorber, an evaporator with a sump, and high and low temperature generators, all interconnected to form a closed system that can be selectively switched between cooling and heating mode so operation, comprising:

a refrigerant storage tank having sufficient capacity for storing, during cooling mode operation, an amount of refrigerant sufficient to allow for efficient operation when released into the system for heating mode operation, said refrigerant storage tank being located vertically above said condenser; and fluid interconnection means between the high-temperature generator and said refrigerant storage tank during cooling mode operation for conducting the flow of refrigerant vapor from the high-temperature generator to the low-temperature generator where it is condensed into liquid form, and for conducting the resultant liquid refrigerant from said low temperature generator to said refrigerant storage tank.

8. A refrigerant storage apparatus as set forth in claim 7 and including drainage means for selectively transferring stored refrigerant from said refrigerant storage tank to said evaporator sump when the system is converted from cooling to heating mode of operation.

9. A refrigerant storage apparatus as set forth in claim 7 and including overflow structure to allow refrigerant to flow out of said refrigerant storage tank and into the evaporator sump when the quantity of liquid refrigerant in the storage tank exceeds a predetermined storage capacity.

10. A refrigerant storage apparatus as set forth in claim 7 wherein said fluid interconnection means includes a flow restrictor between the low-temperature generator and said refrigerant storage tank for restricting the flow of refrigerant vapor to said refrigerant storage tank.

11. A refrigerant storage apparatus as set forth in claim 8 wherein said means between said refrigerant storage tank and the evaporator sump is interconnected to the condenser to allow condensate from said condenser to flow to the evaporator sump.

12. A refrigerant storage system as set forth in claim 7 wherein the minimum pressure difference between the high-temperature generator and said refrigerant storage tank during part load operation of the absorption system is at least 150 mm hg.

\* \* \* \* \*